US012742409B2

(12) United States Patent
Niess et al.

(10) Patent No.: US 12,742,409 B2
(45) Date of Patent: Sep. 22, 2026

(54) COOLANT TANK WITH OUTER COMPONENT INTERFACES AND OUTER CHANNELS FOR CONDUCTING COOLANT

(71) Applicant: HELLA GmbH & Co. KGaA, Lippstadt (DE)

(72) Inventors: Dominik Niess, Selm (DE); Frank Bewermeyer, Paderborn (DE); Sebastian Tiemeyer, Dortmund (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 112 days.

(21) Appl. No.: 18/736,472

(22) Filed: Jun. 6, 2024

(65) Prior Publication Data

US 2024/0318589 A1 Sep. 26, 2024

Related U.S. Application Data

(63) Continuation of application No. PCT/EP2022/054386, filed on Feb. 22, 2022.

(30) Foreign Application Priority Data

Dec. 6, 2021 (DE) ..................... 10 2021 132 065.8

(51) Int. Cl.
*F01P 3/20* (2006.01)
*B60K 11/02* (2006.01)
*F01P 7/14* (2006.01)

(52) U.S. Cl.
CPC ................ *F01P 3/20* (2013.01); *B60K 11/02* (2013.01); *F01P 2007/146* (2013.01)

(58) Field of Classification Search
CPC ........ F01P 3/20; F01P 2007/146; F01P 7/165; F01P 11/029; F01P 11/04; F01P 5/10;
(Continued)

(56) References Cited

U.S. PATENT DOCUMENTS 10,665,908 B2 5/2020 Krull et al.
2022/0314737 A1* 10/2022 Hwang .................... F01P 5/10
(Continued)

FOREIGN PATENT DOCUMENTS

DE 2844494 A1 4/1979
DE 102015000424 B3 4/2016
(Continued)

OTHER PUBLICATIONS

International Search Report dated Sep. 14, 2022 in corresponding application PCT/EP2022/054386.

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

A coolant conducting system for a motor vehicle with multiple coolant circuits, comprising a coolant tank with an interior which is designed to store coolant and comprising multiple coolant channels which are designed to introduce coolant from the coolant tank into at least two coolant circuits. At least one of the coolant tanks is made of a channel wall which is at least partly arranged on an outer wall of the coolant tank and is designed to conduct coolant so as to at least partly follow the contour of the outer wall of the coolant tank.

9 Claims, 9 Drawing Sheets

(58) Field of Classification Search
CPC .... B60K 11/02; B60K 15/03177; B60K 1/00; F16K 11/0853; F16K 11/0856; F16K 11/20; F16K 11/207; F16K 27/065; F16K 31/041; F16K 31/535
See application file for complete search history.

(56) References Cited

U.S. PATENT DOCUMENTS

| | | | | |
|---|---|---|---|---|
| 2022/0316609 | A1 | 10/2022 | Tiemeyer et al. | |
| 2022/0325657 | A1* | 10/2022 | Jeong | F01P 5/10 |

FOREIGN PATENT DOCUMENTS

| | | | |
|---|---|---|---|
| EP | 3909798 | A1 | 11/2021 |
| KR | 20090109856 | A | 10/2009 |
| WO | WO2017223232 | A2 | 12/2017 |
| WO | WO2021122056 | A1 | 6/2021 |

* cited by examiner 420
410
420
80
420
420
410
80
410
420
80

400
410
420
90
55
50
420
90

COOLANT TANK WITH OUTER COMPONENT INTERFACES AND OUTER CHANNELS FOR CONDUCTING COOLANT

This nonprovisional application is a continuation of International Application No. PCT/EP2022/054386, which was filed on Feb. 22, 2022, and which claims priority to German Patent Application No. 10 2021 132 065.8, which was filed in Germany on Dec. 6, 2021, and which are both herein incorporated by reference.

BACKGROUND OF THE INVENTION

Field of the Invention

The present invention relates to a coolant tank with outer component interfaces and outer channels for conducting coolant.

Description of the Background Art

Motor vehicles with electric drives have the disadvantage compared to vehicles with internal combustion engines that a dissipation of the heat generated by the motor places more complex demands on a cooling system of the motor vehicles. Whereas only the engine heat must be carried away by a coolant circuit in the case of an internal combustion engine, which requires just a single coolant circuit even in the case of additional utilization of the engine heat for heating the passenger compartment of the vehicle, electric-powered vehicles usually require multiple separate coolant circuits. On the one hand, excess motor heat must be carried away, and on the other hand, a vehicle battery and the passenger compartment must be either cooled or heated, depending on the ambient temperature of the vehicle, in order to ensure optimal function of the electric-powered motor vehicle. Furthermore, in the case of low ambient temperatures, for example, the vehicle battery must be heated even when no excess motor heat needs to be carried away or when the vehicle has been started but a motor of the vehicle is not, or at least not yet, producing any appreciable waste heat. In addition to a cooling device for the coolant of a coolant circuit, a heating device that raises a coolant temperature as needed is therefore generally required, as well.

Unlike in vehicles with internal combustion engines, multiple separate coolant circuits are thus usually necessary in order to be able to efficiently regulate the motor temperature, the battery temperature, and the passenger compartment temperature of a motor vehicle. These coolant circuits must be fed and regulated by coolant conducting systems for multiple coolant circuits.

An example for feeding and regulating multiple coolant circuits for an electric vehicle is disclosed by the document WO 2017/223232 A2, which corresponds to US 2017/0373359. The document shows a coolant tank, for example for an electric vehicle, that has multiple components arranged in its interior for creating multiple coolant circuits. The positioning of the components, for example the lines for the individual coolant circuits, in the interior of the tank itself is space efficient, but is associated with considerable additional effort for making these components accessible in the event of damage or necessary maintenance thereof. In addition, a multiplicity of thermal bridges between all components of the multiple coolant circuits is created by the shifting of the device components into the interior of the coolant tank so that all of these interact with one another, and a regulation effort for the coolant circuits is increased. Moreover, the volume capacity is reduced by every device component shifted into the interior of the tank so that the tank must be enlarged to maintain a specific coolant volume capacity. Moreover, a tank with internal device components is considerably more difficult to manufacture than a tank that is configured solely to hold and store coolant.

SUMMARY OF THE INVENTION

It is therefore an object of the invention to provide a coolant conducting system for a motor vehicle with multiple coolant circuits that overcomes the aforementioned disadvantages and nevertheless can be arranged especially space-efficiently and can be manufactured in a simplified way compared with known solutions.

In an example, provided is coolant conducting system for a motor vehicle with multiple coolant circuits that has a coolant tank with an interior space that is configured to store a coolant. Arranged on this coolant tank are multiple coolant channels that are configured to deliver the coolant from the coolant tank into at least two coolant circuits, in particular coolant circuits that are separate or independent from one another, and/or to deliver the coolant from the at least two coolant circuits back into the coolant tank.

The coolant channels are not hoses, but instead are rigid or inflexible coolant ducts. The coolant channels can, in particular, be produced together with the coolant tank, for example through an injection molding process, and/or have a production material that corresponds to a production material of the coolant tank. The coolant channels can, in particular, be integral parts of the coolant conducting system and be provided together therewith and/or be molded onto the coolant tank so that at least the coolant tank and the coolant channels can be arranged together in a motor vehicle and/or installed in a motor vehicle without it being necessary to connect the coolant channels to the motor vehicle tank in a separate step for this purpose.

At least one of the coolant channels can be formed by a channel wall that is at least partly arranged on an outer wall of the coolant tank and is configured to conduct the coolant so as to follow at least parts of a contour of the outer wall of the coolant tank. In one variant, the channel wall of the at least one coolant channel can rest against the outer wall of the coolant tank in this case. In other examples, however, the channel wall of the at least one coolant channel can also have a slight distance from the outer wall of the coolant tank, for example a distance of up to 5 mm, in particular a distance from 1 mm to 5 mm.

Advantages of this arrangement are that the coolant conducting system can feed multiple coolant circuits, on the one hand, yet at the same time is very space efficient to implement and simple to install in a motor vehicle. The coolant channels are easily accessible from outside, and thus can be inspected easily for damage and/or be maintained. The device can be manufactured efficiently, and thermal bridges between the individual coolant circuits can at least be reduced.

At least a part of the channel wall of the at least one coolant channel and at least a part of the outer wall of the coolant tank can be designed as a single piece with one another. In other words, in an example, the outer wall of the coolant tank can simultaneously form a part of a channel wall for a coolant channel.

An advantage of this design is that the efficiency of the coolant conducting system with respect to space, materials, manufacturing, and arrangement can be maximized.

Furthermore, the coolant tank can be formed by two tank components arranged one upon the other that together enclose the interior space with the exception of openings for the coolant channels and/or other openings, for example for filling the coolant tank with coolant. For example, the two tank components can each be parts of a coolant tank produced in the shape of a half shell or in the shape of a half tank by means of an injection molding process, in particular a plastic injection molding process.

Optionally, the two tank components can be arranged one upon the other can, in combination, additionally form at least a part of one or more coolant channels. For example, the tank components can each have sections that are semitubular or in the shape of a half channel that form one or more coolant channels after a joining or after an arrangement of the tank components one upon the other.

An advantage of this design is that the tank components, which can be produced by means of an injection molding process, for example, can, in addition to the coolant tank, also at the same time form one or more coolant channels for connecting the coolant tank to the coolant circuits and/or to a coolant distribution assembly, each of which channels are realized through semitubular or half-channel-shaped sections of the tank components. The efficiency of the coolant conducting system with respect to space, materials, manufacturing, and arrangement can be further improved by this means.

Furthermore, the coolant tank can be designed such that the interior space of the coolant tank is free of lines and/or free of valves, pumps, or control devices for a coolant flow. In other words, the coolant tank can be free of device components that are arranged completely or partly in the interior space of the coolant tank.

An advantage of this design is that the volume available for coolant in the interior space of the coolant tank is maximized, and that an influencing of a temperature of the individual device components by the temperature of the coolant in the coolant tank and/or an interaction of the device components with one another on account of their arrangement in a common coolant environment is precluded.

Furthermore, the coolant conducting system can have at least a first control valve that is configured to control or to regulate the delivery of coolant into at least a first of the coolant circuits. Optionally, the first control valve can include a rotary actuator that is designed to move the control valve from an open position into a closed position and/or from a closed position into an open position. The first control valve can be a rotary valve with multiple possible valve positions.

An advantage of the coolant conducting system with at least one control valve is that the coolant from the coolant tank can be supplied selectively and/or in a demand-based manner to one or more of the coolant circuits through the coolant channels.

The control valve can be arranged on the coolant channels and/or on the coolant tank. The coolant tank and/or the coolant channels can have one or more receptacle sections for receiving or arranging control valves, for example control valves in the form of rotary actuators.

Furthermore, the coolant conducting system can have a controller or regulator for the one or the multiple control valves, for example in the form of an electronic control or regulating device. The control or regulating device can be arranged on the coolant channels and/or on the coolant tank. The coolant tank and/or the coolant channels can furthermore have one or more receptacles for one or more control or regulating devices, in particular prepared recesses in the coolant tank and/or in at least one tank component.

An advantage of this design is that the coolant conducting system with an integrated controller and/or regulator for the coolant circuits can be provided in a space-efficient manner and as a modular assembly. In this way, the possibilities and the effort for arranging the coolant conducting system in a motor vehicle can be improved.

The first control valve can be designed as part of a coolant distribution assembly, in particular a modular coolant distribution assembly, that can be produced separately from the coolant tank and, in particular, can be detachably arranged on one or more of the coolant channels. The coolant distribution assembly can optionally have additional device components, for example a coolant pump, and/or prepared receptacles for device components.

Furthermore, the first control valve can be configured to control or to regulate the delivery of coolant into at least two coolant circuits. The first control valve can have at least two valve sections that are each configured to control or to regulate the delivery of coolant into one of the multiple coolant circuits in each case. The two valve sections can each be configured to be moved, in particular rotated, together with one another.

For example, the first control valve can be a rotatable or rotary fluid valve that has at least two valve sections arranged along a common axis of rotation that are each configured to control or regulate different coolant circuits. The valve sections can be connected to one another in a fixed manner and/or arranged immovably relative to one another so that the valve sections can only be turned or rotated together about the axis of rotation.

The control valve that is configured to control or to regulate at least two coolant circuits can be arranged at least partly in and/or on two different coolant channels, wherein these at least two different coolant channels are each configured to deliver coolant into two different coolant circuits. The two coolant channels that are different from one another can extend and/or be arranged at least partly parallel to one another in the region of the control valve. In one variant, the control valve can cross and/or at least partly pass through at least one of the two coolant channels that are different from one another. A first valve section of the control valve can be arranged on or in the first coolant channel, and a second section of the control valve can be arranged on or in the second coolant channel.

An advantage of this design is that multiple, for example two, coolant circuits can be controlled by a single valve so that the complexity for controlling or moving the valves is reduced. Furthermore, a precision of the control of the coolant circuits is improved by this means, since one control valve with at least two valve sections that are immovable relative to one another for different coolant circuits always defines a predetermined ratio between the coolant deliveries into the different coolant circuits.

Further advantages of the control valve with multiple valve sections are an improvement in the space efficiency of the control valves as compared with individual control valves for each coolant circuit, and a reduction in the control or regulating complexity, in particular electronic control or regulating complexity, as a result of a reduction in the control loops to be implemented.

The device can furthermore have a second control valve that is configured to control or to regulate the delivery of coolant into a second coolant circuit. The second control valve can, for example, include a rotary actuator that is designed to move the control valve from an open position into a closed position and/or from a closed position into an open position. The second control valve can be a rotary valve with multiple possible valve positions.

The second control valve can be arranged on a side of a device element made as a single piece that is opposite the first control valve, for example a part of a coolant distribution assembly or a section of the coolant channels. Optionally, the first and the second control valve can be rotatable and/or rotary about an imaginary common axis of rotation. The first and/or the second control valve can be rotatable in the clockwise direction and/or the counterclockwise direction.

An advantage of this design is that the mutually opposite arrangement of control valves improves a space efficiency of the coolant conducting system.

A coolant distribution assembly for a motor vehicle with multiple coolant circuits has multiple coolant pipes that are each configured to deliver coolant for a motor vehicle into a coolant circuit. Furthermore, the coolant distribution assembly has at least a first control valve that is configured to control or to regulate the delivery of coolant from the coolant pipes into at least a first coolant circuit. At least a part of a wall of each of the multiple coolant pipes is formed by a device element made as a single piece.

An advantage of the coolant distribution assembly is that this assembly can be manufactured very efficiently, for example by an injection molding process, wherein the coolant channels are each at least partly formed by a device element manufactured as a single piece, for example by an injection molding process.

The device element can be made as a single piece can form parts of walls of at least two different coolant pipes with two different, in particular mutually opposite, surfaces or outer sides. In other words, in each case the device element formed as a single piece can form at least parts of the coolant pipes, wherein the coolant pipes formed at least partly in each case by the device element are arranged on or at different surfaces or sides of the device element, in particular on or at mutually opposite surfaces or sides.

A further advantage is that the coolant distribution assembly can be made in modular fashion and can be arranged in a motor vehicle and/or coupled to a coolant conducting system. As a result, a replacement of the coolant distribution assembly in the case of damage, for example, or the removal of the coolant distribution assembly for maintenance, is facilitated.

The coolant distribution assembly can have, for example, at least 2, 4, 6, 8, or 10 coolant pipes, whose walls are each at least partly formed by the device element made as a single piece.

The coolant distribution assembly can be configured to be coupled or connected to a coolant conducting system with multiple coolant channels, for example. The coolant pipes of the coolant distribution assembly can each be configured to be detachably arranged on a coolant tank formed separately from the coolant distribution assembly or on a coolant conducting system formed separately from the coolant distribution assembly and/or to be coupled thereto. The coolant pipes of the coolant distribution assembly can, in particular, be coupled or connected to coolant channels of a coolant conducting system so that coolant from the coolant tank of the coolant conducting system can be conducted through the coolant channels into the coolant pipes of the coolant distribution assembly and/or can arrive therein.

The coolant pipes can be arranged at least partly parallel to one another. Furthermore, the coolant pipes can each have a hose connection for a coolant hose. In this way, the arrangement of coolant hoses for different coolant circuits on the coolant distribution assembly can be improved, in particular facilitated.

The first control valve can include a rotary actuator that is designed to move the control valve from an open position into a closed position and/or from a closed position into an open position. The first control valve can be a rotary valve with multiple possible valve positions.

The first control valve can furthermore be configured to control or to regulate the delivery of coolant into at least two coolant circuits. The first control valve can have at least two valve sections that are each configured to control or to regulate the delivery of coolant into one of the multiple coolant circuits in each case. The two valve sections can each be configured to be moved together with one another, in particular rotated together with one another.

For example, the first control valve can be a rotatable or rotary fluid valve that has at least two valve sections arranged along a common axis of rotation that are each configured to control or regulate different coolant circuits. The valve sections can be connected to one another in a fixed manner and/or arranged immovably relative to one another so that the valve sections can only be turned or rotated together about the axis of rotation.

The control valve that is configured to control or to regulate at least two coolant circuits can be arranged at least partly in and/or on two different coolant pipes, wherein these at least two different coolant pipes are each configured to deliver coolant into two different coolant circuits. The two coolant pipes that are different from one another can extend and/or be arranged at least partly parallel to one another in the region of the control valve. In one variant, the control valve can cross or at least partly pass through at least one of the two coolant pipes that are different from one another. A first valve section of the control valve can be arranged on or in a first coolant pipe, and a second section of the coolant pipe can be arranged on or in the second coolant pipe.

An advantage of this design is that multiple, for example two, coolant circuits can be controlled by a single valve so that the complexity for controlling or moving the valves is reduced. Furthermore, a precision of the control of the coolant circuits is improved by this means, since one control valve with at least two valve sections that are immovable relative to one another for different coolant circuits always defines a predetermined ratio between the coolant deliveries into the different coolant circuits.

Alternatively or in addition, the coolant distribution assembly can have a second control valve that is configured to control or to regulate the delivery of coolant into at least a second coolant circuit.

The second control valve can include a rotary actuator that is designed to move the control valve from an open position into a closed position and/or from a closed position into an open position. The second control valve can be a rotary valve with multiple possible valve positions.

The second control valve can be arranged on a side of the device element made as a single piece that is opposite the first control valve.

In other words, the first control valve can be arranged on or at a first side or surface of the device element made as a single piece and/or the second control valve can be arranged on or at a second side or surface of the device element made as a single piece.

An advantage of this design is that the mutually opposite arrangement of control valves improves a space efficiency of the coolant conducting system and, moreover, is efficient to manufacture.

The first and the second control valve can be rotatable and/or rotary about a common, in particular imaginary, axis of rotation. The first and/or the second control valve can each be rotatable in the clockwise direction and/or the counterclockwise direction about the common, in particular imaginary, axis of rotation.

The first and the second control valve can each control or regulate the coolant delivery into one or into multiple coolant circuits. In one variant, the first and the second control valve can be configured to control and/or to regulate the coolant delivery into a first coolant circuit.

Furthermore, the coolant distribution assembly can have at least one coolant pump that is designed to bring about the delivery of the coolant into at least one of the coolant circuits. The coolant pump can be arranged in a pump receptacle provided in the coolant distribution assembly for this purpose and/or can be provided together with the coolant distribution assembly and arranged in a motor vehicle and/or on a coolant conducting system.

Optionally, the coolant distribution assembly can additionally have at least one temperature sensor that is configured to sense a temperature of a coolant in at least one of the coolant pipes.

In addition, an electronic control unit can be configured to control or to regulate the first and/or the second control valve and/or the at least one coolant pump. In particular, the electronic control unit can be configured to control or regulate the first and/or the second control valve and/or the at least one coolant pump at least partly based on a sensing of the at least one temperature sensor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
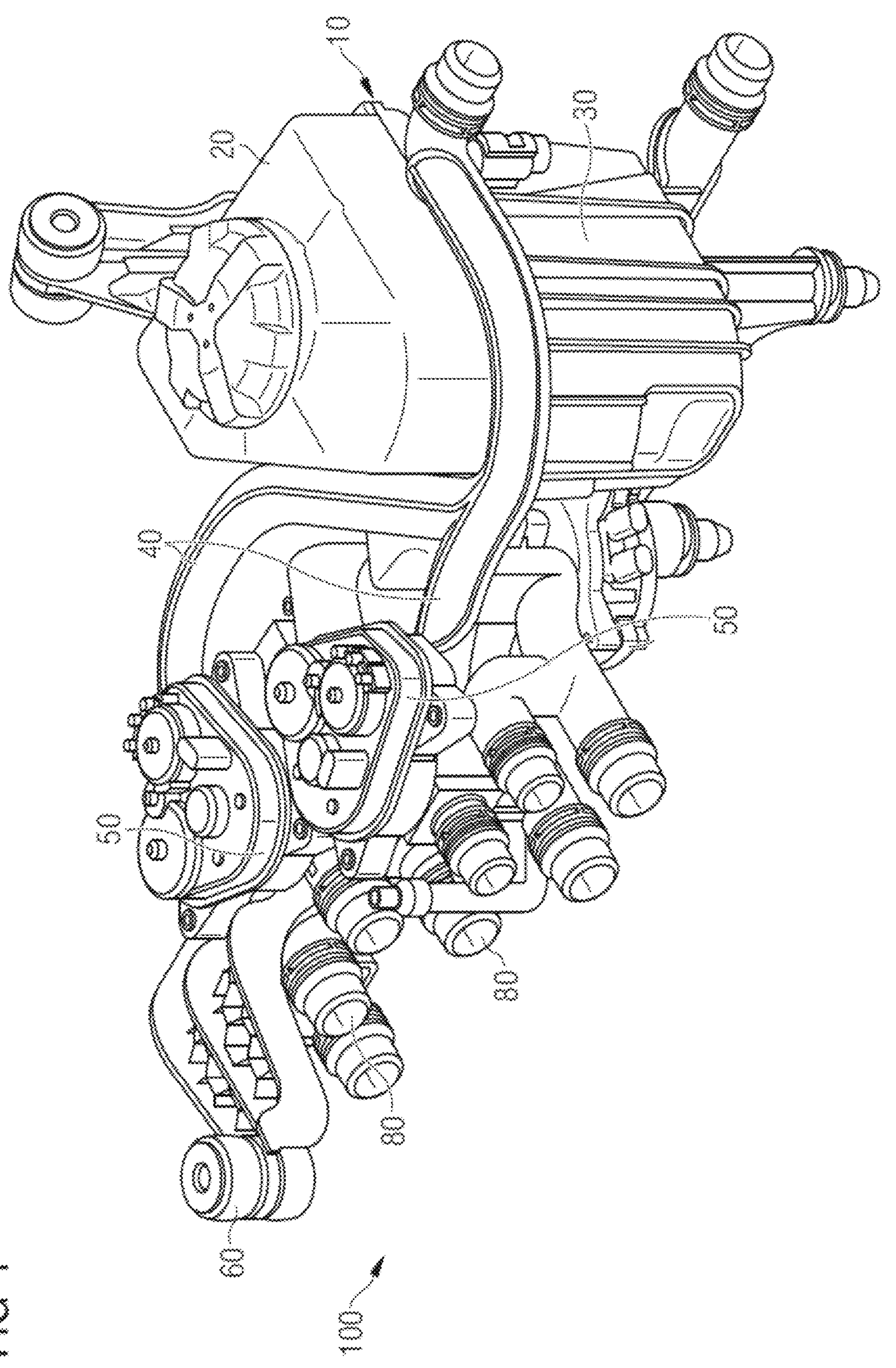
FIGS. 1 and 2 show an example of a coolant conducting system according to the invention.
Figure 2:
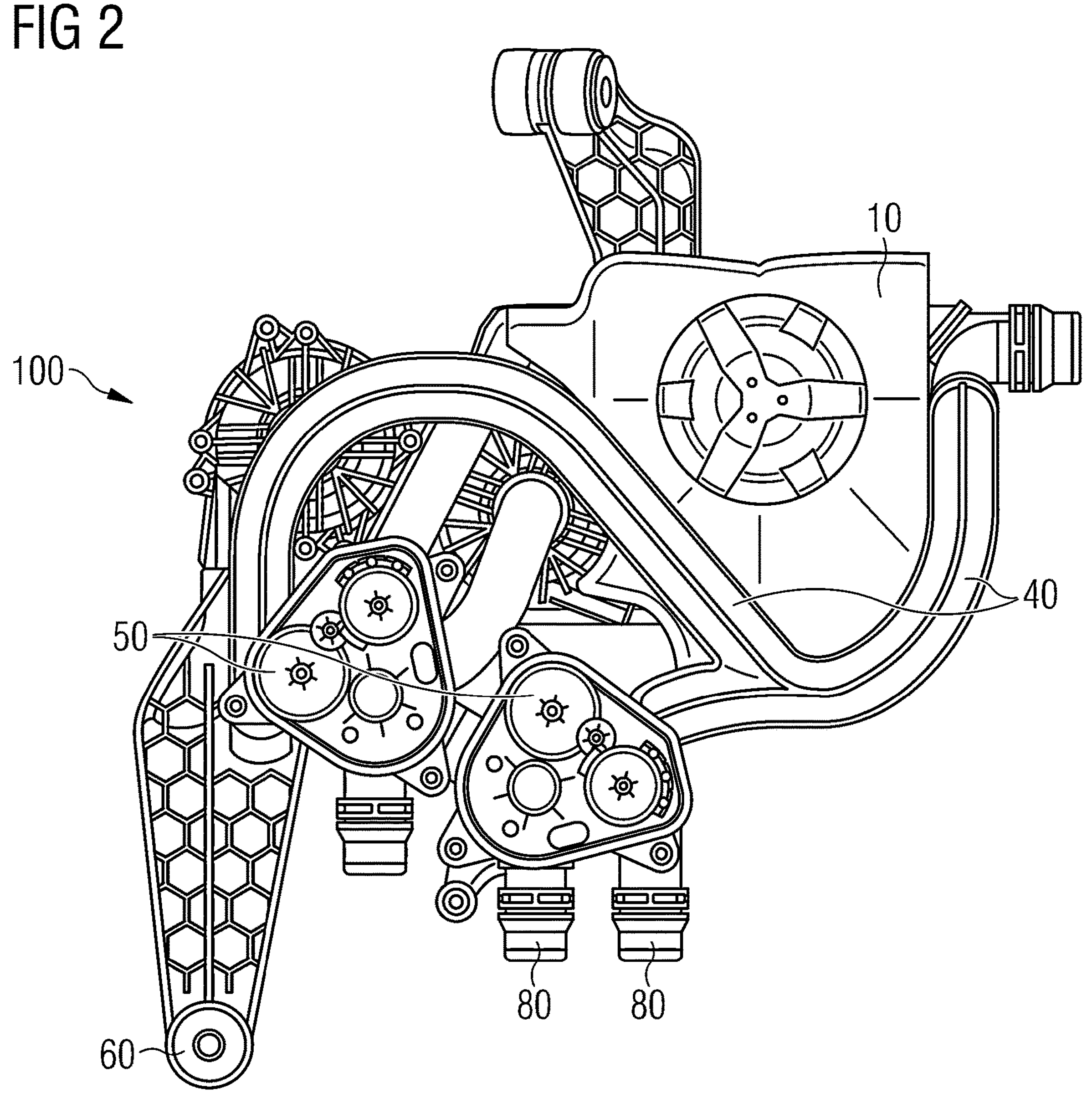

FIG. 1 shows a coolant conducting system 100 that has a coolant tank 10 and multiple coolant channels 40. FIG. 2 shows the same coolant conducting system from a different perspective, namely in a top view.

The coolant channels 40 are configured to deliver the coolant from the coolant tank 10 into different coolant circuits of a motor vehicle. For this purpose, the coolant channels 40 are arranged at least partly on the coolant tank 10 and have hose receptacles 80 that are each configured for connection or coupling to a coolant hose.

The tank 10 includes two tank components 20, 30, which are each made of a plastic material with an injection molding process. The tank components 20, 30 each have a section in the shape of a half shell, and in combination form the coolant tank 10. The interior space of the depicted coolant tank 10 is free of lines and other device elements such as pumps or valves.

The coolant channels 40 are rigid, inflexible coolant ducts, and are likewise formed by half-shell-shaped sections of the two tank components 20, 30. The coolant channels 40 that are shown are thus likewise made of a plastic material by means of an injection molding process, and are formed together with the coolant tank 10.

At least one of the coolant channels 40 has a channel wall formed by the tank components 20, 30 that is at least partly arranged on the outer wall of the coolant tank 10 and that is configured to conduct the coolant so as to follow at least parts of the contour of the outer wall of the coolant tank 10, which outer wall is likewise formed by the tank components 20, 30.

In the example shown, at least sections of the channel wall and the outer wall of the coolant tank 10 are designed as a single piece.

Furthermore, FIGS. 1 and 2 show the control valves 50, which regulate the coolant supply from the coolant tank 10 into the multiple coolant circuits. The control valves 50 are each arranged on the coolant channels 40, and each include a rotary actuator that in each case can move the control valves from an open position into a closed position or from a closed position into an open position. The control valves 50 are each rotary valves with multiple possible valve positions.

Furthermore, the coolant conducting system 100 shown in FIGS. 1 and 2 is configured to be arranged and attached in a motor vehicle with multiple coolant circuits, for example in a vehicle with an electric drive, using the attachment 60 shown.

Figure 3:
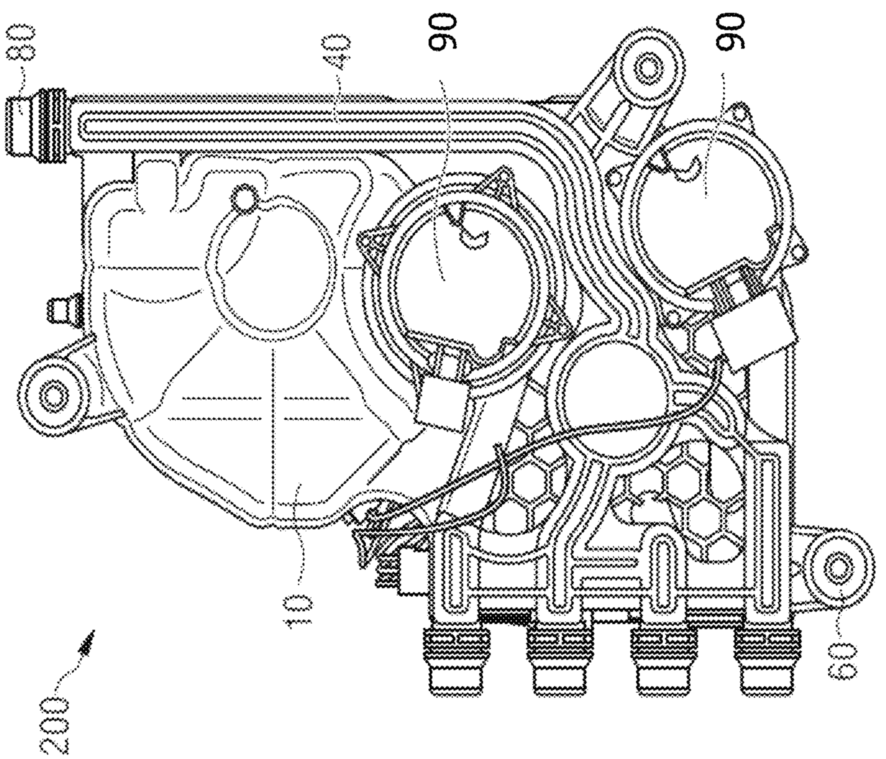
FIGS. 3 and 4 show an example of a coolant conducting system according to the invention.
Figure 3:
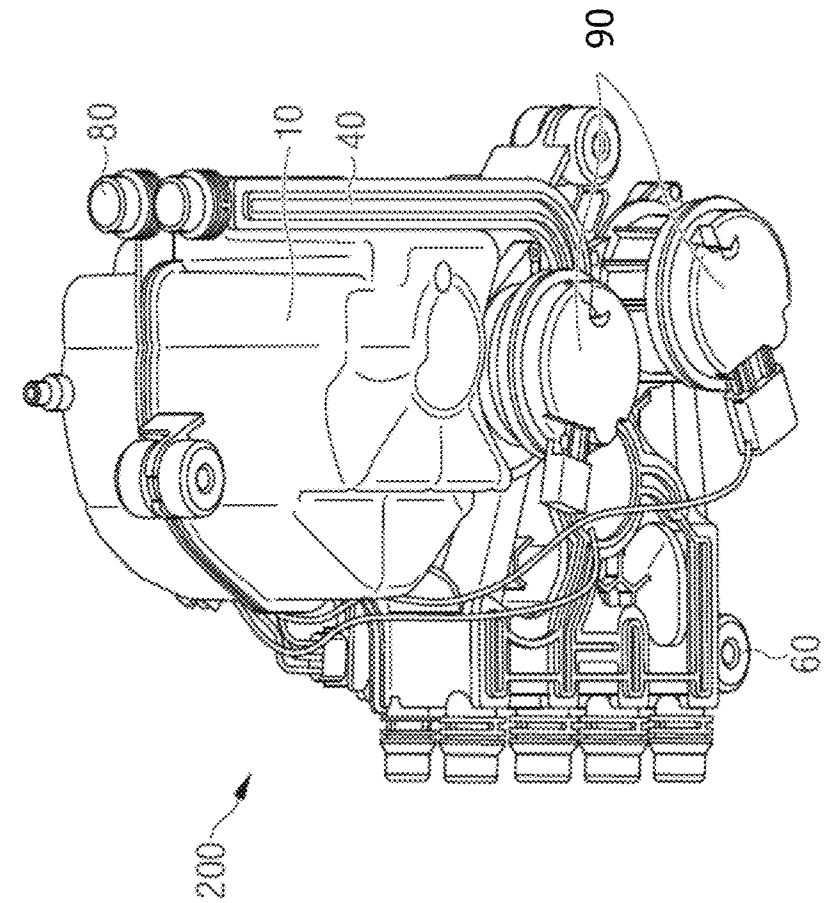
Figure 4:
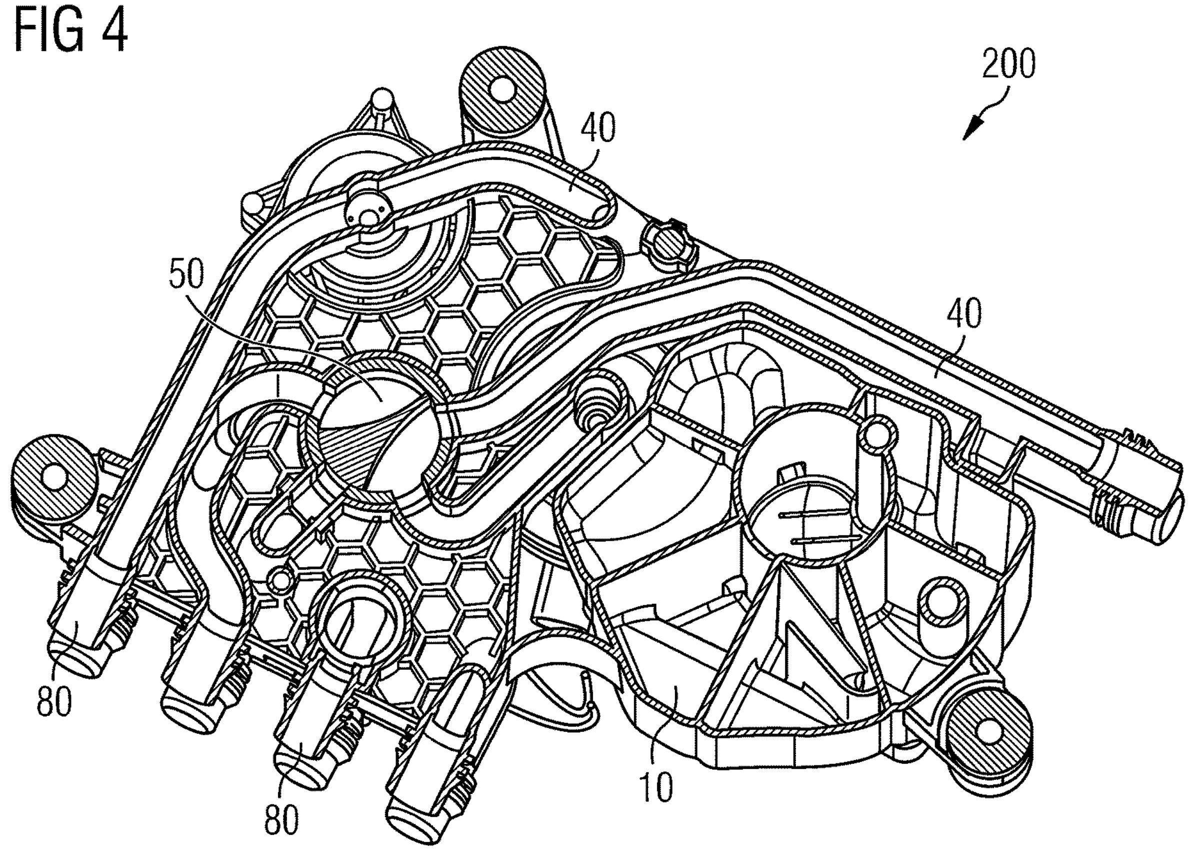

FIG. 3 shows another coolant conducting system 200. FIG. 4 shows a sectional view of the coolant conducting system 200 that is shown in a perspective view in FIG. 3.

The individual components of the coolant conducting system 200 and their function correspond to the device components described with reference to FIG. 1 and FIG. 2. In addition, the coolant conducting system 200 has two coolant pumps 90 that are each configured to pump coolant into at least one of the coolant circuits.

As is furthermore clearly visible on the basis of FIG. 4, it is also the case here that at least one of the coolant channels 40 is at least partly arranged on the outer wall of the coolant tank 10, which is to say rests against the outer wall of the coolant tank 10 and/or is spaced slightly apart therefrom. The at least one coolant channel 40 arranged partly on the outer wall of the coolant tank 10 conducts the coolant from the coolant tank so as to follow at least parts of a contour of the outer wall.

Figure 5:
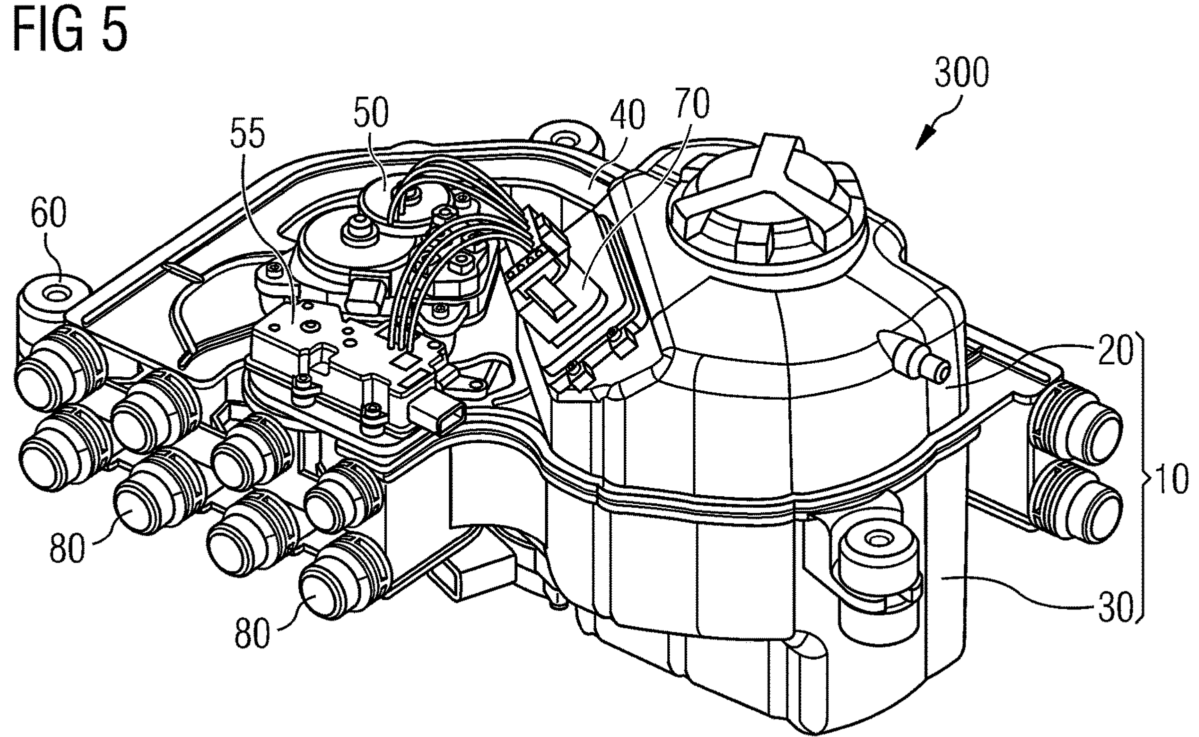
FIGS. 5 and 6 show an example of a coolant conducting system according to the invention.
Figure 6:
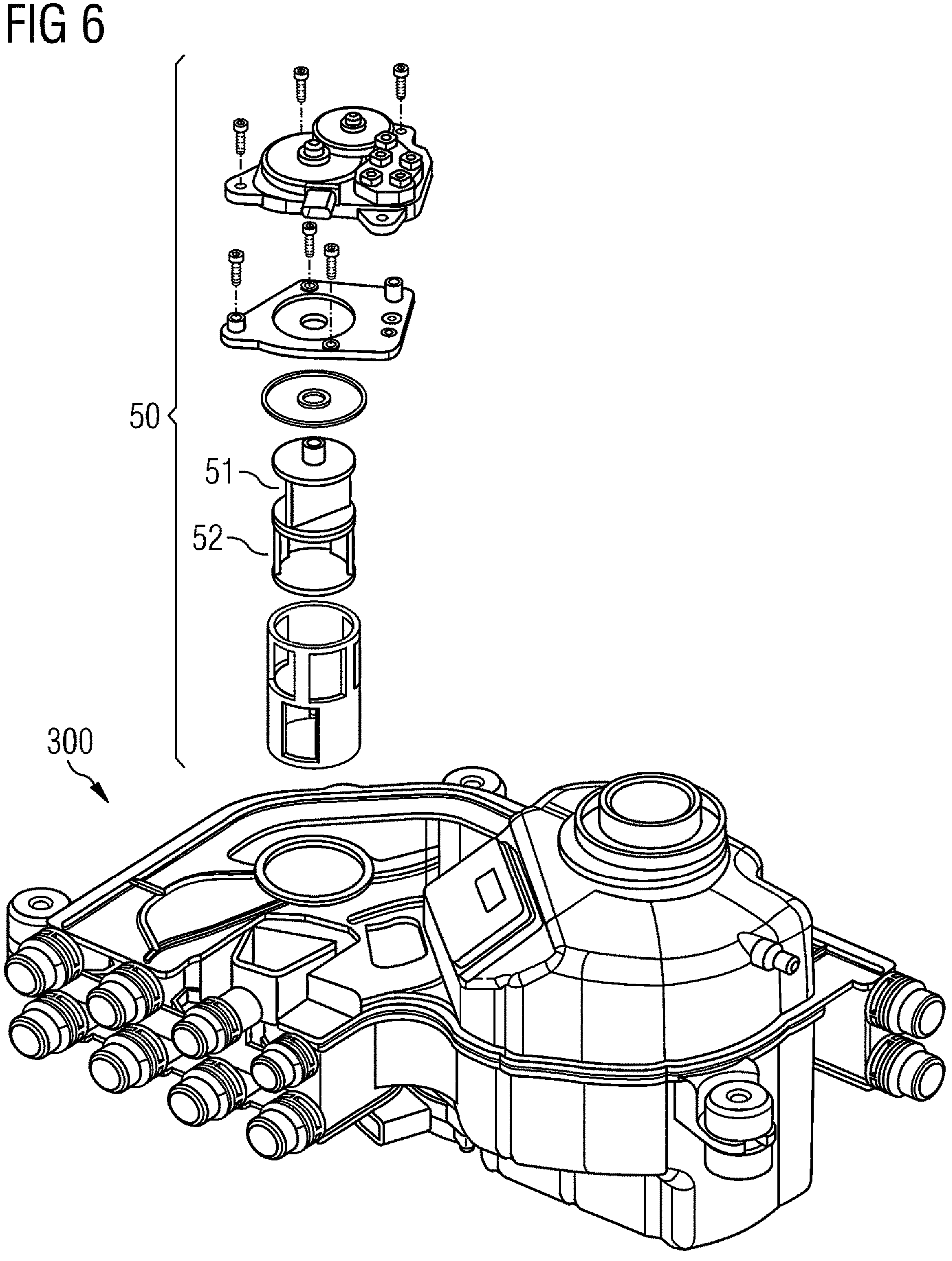

FIGS. 5 and 6 show another example of a coolant conducting system 300. As in the examples shown in FIGS. 1 and 2, the coolant conducting system 300 has a coolant tank 10 and multiple coolant channels 40 for conducting coolant out of the coolant tank 10, wherein the coolant tank 10 and the coolant channels 40 are each formed by the two tank components 20, 30, which are made of a plastic material by means of an injection molding process. The coolant conducting system 300 can be arranged and attached in a motor vehicle with the aid of the attachment 60. The coolant channels 40 have hose receptacles 80 for connection to coolant hoses for multiple coolant circuits.

Furthermore, the coolant conducting system 300 shown in FIG. 5 has a first control valve 50 and a second control valve 55 that is different from the first control valve 50. The first and second control valves are each arranged on the coolant channels 40 and are each configured to regulate a coolant delivery into one or more of the coolant circuits. The first control valve 50 and the second control valve 55 are each controlled by the control unit 70. The control unit 70 is an electronic controller that is connected to the two control valves 50, 55 by control lines and is arranged in a controller receptacle on the coolant tank 10.

The first control valve 50 is shown in more detail in FIG. 6. In the coolant conducting system 300 shown in FIGS. 5 and 6, the control valve 50 is a rotatable control valve with a first valve section 51 and a second valve section 52, which can each be rotated together about an axis of rotation by a rotary actuator. Each of the two valve sections 51 and 52 in this case regulates or controls the coolant supply into one of the multiple coolant circuits, so that the first control valve 50 can control the coolant delivery into at least two different coolant circuits altogether.

The first control valve 50 with the two valve sections 51 and 52 is configured to be arranged on and/or at least partly in two coolant channels 40 that are arranged one above the other and/or partly parallel to one another, so that the flow of coolant through each of the two coolant channels can be enabled or blocked by a rotation of the first control valve 50 about an axis of rotation. The rotation of the first control valve can be brought about in this case by a rotary actuator that can be controlled by the controller 70.

Figure 7:
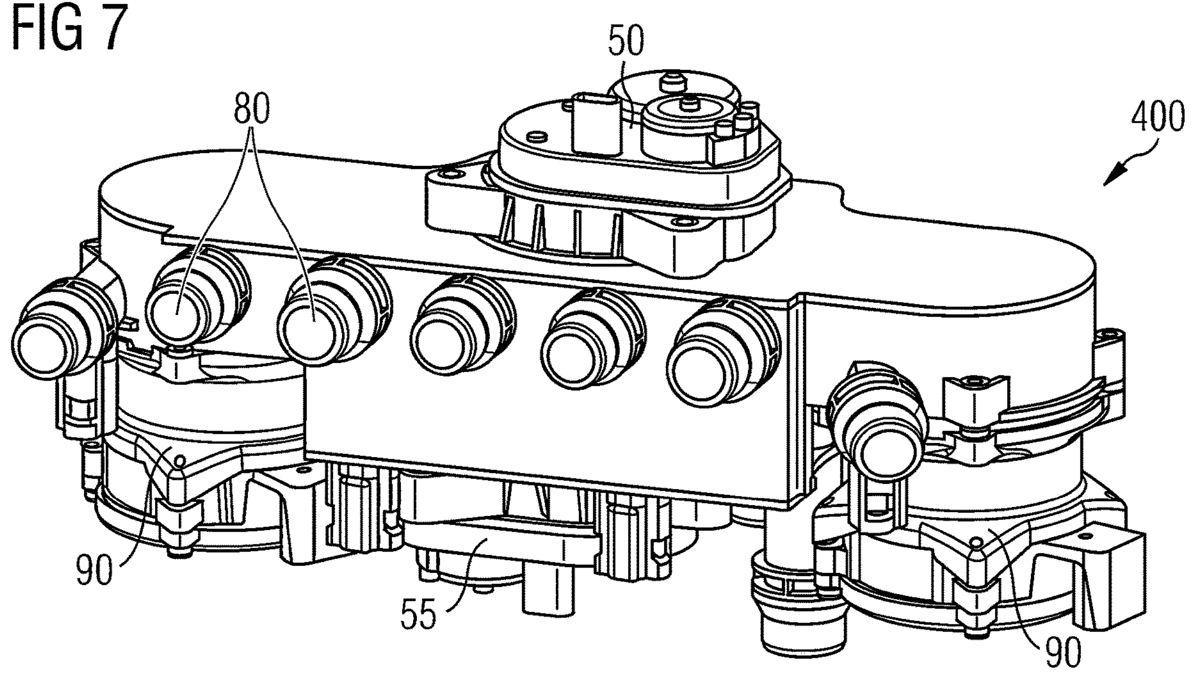
FIGS. 7 to 9 show an example of a coolant distribution assembly according to the invention.

FIG. 7 shows a coolant distribution assembly 400 for a motor vehicle with multiple coolant circuits. The coolant distribution assembly 400 has multiple coolant pipes that are each configured to deliver coolant into a coolant circuit. For this purpose, the coolant distribution assembly 400 has multiple hose receptacles 80 on the coolant pipes, which allow coolant hoses for the coolant circuits to be arranged and secured on the coolant pipes.

The coolant pipes are each configured to be detachably arranged on a coolant tank formed separately from the coolant distribution assembly 400 or on a coolant conducting system formed separately from the coolant distribution assembly 400. The coolant pipes of the coolant distribution assembly 400 can, in particular, be arranged on coolant channels of a coolant conducting system.

FIG. 7 furthermore shows a first control valve 50, which is configured to control the delivery of coolant from the coolant pipes into at least a first coolant circuit, and a second control valve 55, which is configured to control the delivery of coolant from the coolant pipes into at least a second coolant circuit. The delivery of coolant into the various coolant circuits is supported by the coolant pumps 90 that are arranged on the coolant distribution assembly 400 and that are each configured to pump coolant into at least one of the coolant circuits.

Figure 8:
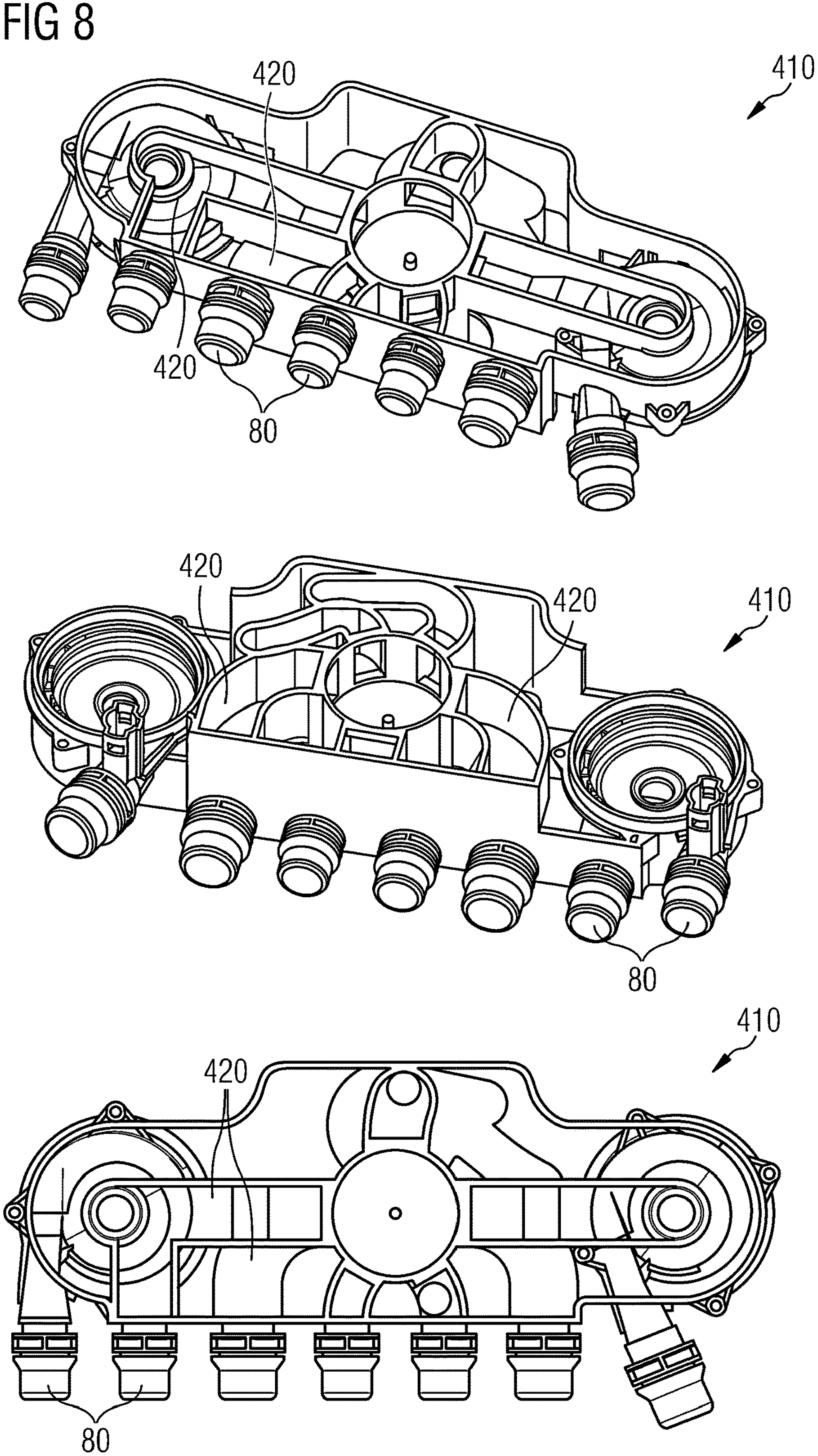

As is shown more precisely in FIG. 8, the coolant distribution assembly 400 shown in FIG. 7 includes a device element 410 that is made as a single piece and that forms at least a part of a wall of each of the multiple coolant pipes 420. In other words, the coolant distribution assembly 400 has multiple coolant pipes 420, wherein each of the coolant pipes 420 is formed at least partly by a device element 410 that is made as a single piece. The device element 410 that is made as a single piece can be a plastic element produced by an injection molding process, for example.

The coolant pipes 420 are formed on two mutually opposite sides of the device element 410. The device element 410 furthermore has openings that permit coolant to cross from one side of the device element 410 to a respective opposite side of the device element 410.

Figure 9:
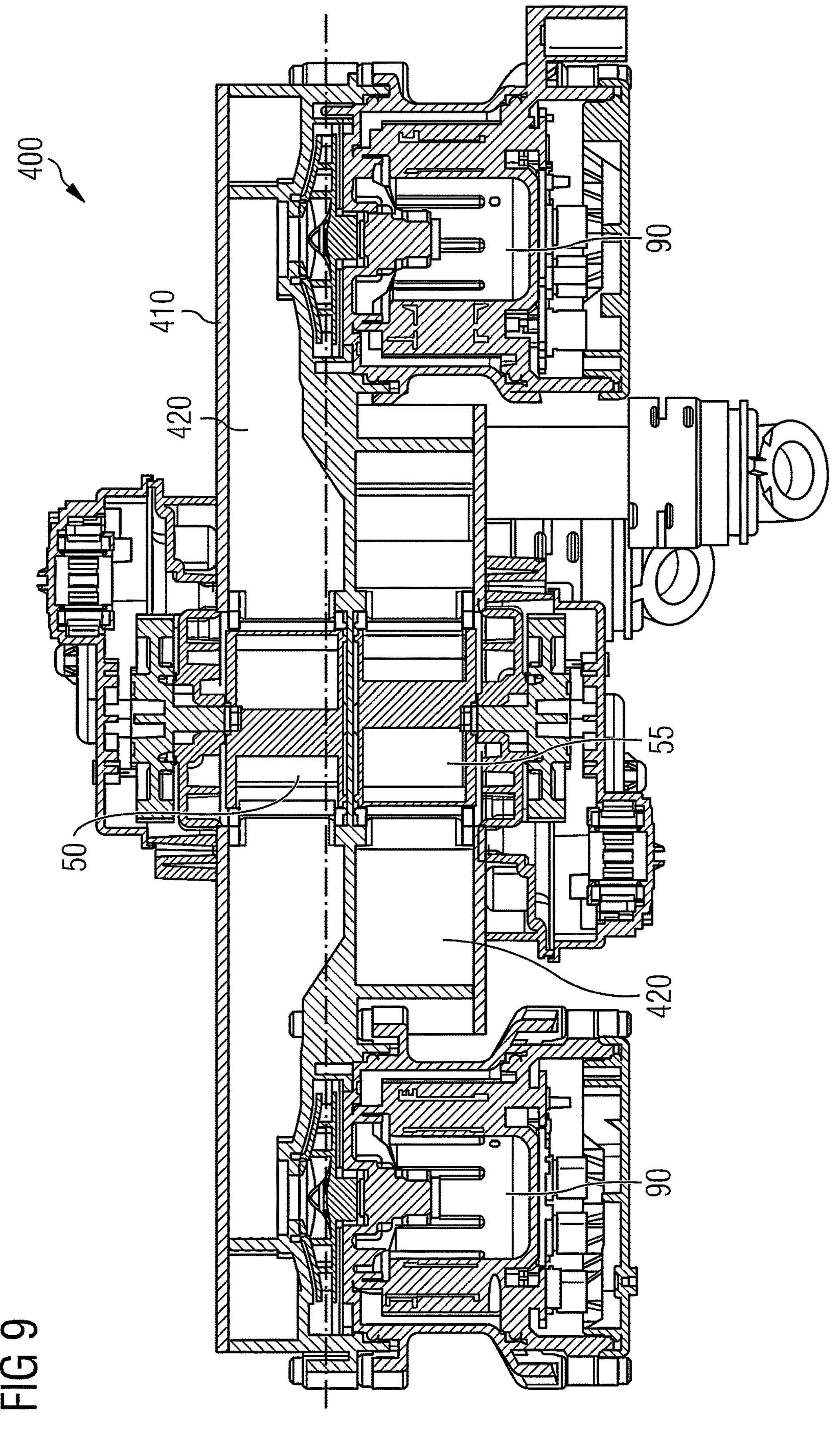

FIG. 9 shows that the coolant pumps 90 as well as the first control valve 50 and the second control valve 55 can be arranged on and/or at the device element 410 that is made as a single piece. The first control valve 50 and the second control valve 55 are each control valves that can be rotated with a rotary actuator and that are arranged on different, namely on two mutually opposite, sides of the device element 410 that is made as a single piece. The first control valve 50 and the second control valve 55 each regulate the coolant supply into different coolant circuits, but are rotatable about the same imaginary axis of rotation. In other words, the imaginary axis of rotation of the first control valve 50 is identical to the imaginary axis of rotation of the second control valve 55.

The variants described above serve merely to improve understanding of the structure, the mode of operation, and the characteristics of the objects disclosed here; they do not by any means restrict the disclosure to the exemplary embodiments. The figures are schematic, wherein some essential characteristics and effects are depicted on a markedly larger scale in order to illustrate the functions, operating principles, technical embodiments, and features. In this regard, every mode of operation, every principle, every technical embodiment, and every feature that is/are disclosed in the figures or in the text can be combined freely and as desired with all claims, every feature in the text and in the other figures, other modes of operation, principles, technical embodiments, and features that are contained in this disclosure or that follow therefrom, so that all possible combinations shall be attributed to the described procedure. This shall also include combinations of all individual statements in the text, which is to say in each paragraph of the description, in the claims, and also combinations of different variants in the text, in the claims, and in the figures. Moreover, the claims do not limit the disclosure, and thus the possibilities of combination with one another, of all features discussed. All disclosed features are explicitly also disclosed individually and in combination with all other features here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coolant conducting system for a motor vehicle, the coolant conducting system comprising:

coolant circuits;

a coolant tank with an interior space that is configured to store a coolant;

coolant channels that are configured to deliver the coolant from the coolant tank into the coolant circuits, at least one of the coolant channels being formed by a channel wall that is at least partly arranged on an outer wall of the coolant tank and is configured to conduct the coolant so as to follow at least parts of a contour of the outer wall of the coolant tank; and a first control valve, which is configured to control the delivery of the coolant into at least two of the coolant circuits, and is at least partially arranged in at least two of the coolant channels, wherein the first control valve has at least two valve sections that are each connected to a respective one of the at least two of the coolant channels which deliver the coolant from the coolant tank to the first control valve, each of the at least two valve sections of the first control valve are configured to control the delivery of coolant into a respective one of the at least two of the coolant circuits, and wherein the at least two valve sections are configured to be moved or rotated together with one another.

2. The coolant conducting system according to claim 1, wherein at least a part of the channel wall of the at least one of the coolant channels and at least a part of the outer wall of the coolant tank are formed as a single piece with one another.

3. The coolant conducting system according to claim 1, wherein the coolant tank is formed by two tank components arranged one upon the other that together enclose the interior space with the exception of openings for the coolant channels and/or openings for a coolant supply.

4. The coolant conducting system according to claim 3, wherein the two tank components that are arranged one upon the other in combination additionally form at least a part of one of the coolant channels.

5. The coolant conducting system according to claim 1, wherein the interior space of the coolant tank is free of lines and/or free of valves, pumps, or control devices.

6. The coolant conducting system according to claim 1, wherein the first control valve comprises a rotary actuator.

7. The coolant conducting system according to claim 1, wherein the first control valve is formed as part of a coolant distribution assembly that is produced separately from the coolant tank or is detachably arranged on the at least two of the coolant channels.

8. The coolant conducting system according to claim 1, further comprising a second control valve that is configured to control the delivery of coolant into another one of the coolant circuits, wherein the second control valve includes a rotary actuator, and/or wherein the second control valve is arranged on a side of a device element of the coolant conducting system that is opposite the first control valve.

9. The coolant conducting system according to claim 1, further comprising a second control valve that is configured to control the delivery of coolant into another one of the coolant circuits, wherein the first control valve and the second control valve are each rotary actuators, and wherein the second control valve operates independently of the first control valve, such that the delivery of coolant into the other one of the coolant circuits is controllable via the second control valve independently of a rotary state of the first control valve.

* * * * *